US011383734B2

(12) United States Patent
Kato et al.

(10) Patent No.: US 11,383,734 B2
(45) Date of Patent: Jul. 12, 2022

(54) VEHICLE CONTROL APPARATUS, VEHICLE CONTROL METHOD, VEHICLE, AND NON-TRANSITORY COMPUTER-READABLE STORAGE MEDIUM

(71) Applicant: HONDA MOTOR CO., LTD., Tokyo (JP)

(72) Inventors: Daichi Kato, Wako (JP); Nozomu Hirosawa, Wako (JP); Kanta Tsuji, Wako (JP); Atsushi Ishioka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 183 days.

(21) Appl. No.: 16/821,721

(22) Filed: Mar. 17, 2020

(65) Prior Publication Data

US 2020/0307628 A1    Oct. 1, 2020

(30) Foreign Application Priority Data

Mar. 27, 2019 (JP) .............................. JP2019-061291

(51) Int. Cl.
*B60W 60/00* (2020.01)
*B60W 40/04* (2006.01)

(52) U.S. Cl.
CPC ........ *B60W 60/0011* (2020.02); *B60W 40/04* (2013.01)

(58) Field of Classification Search
CPC ............ B60W 60/0011; B60W 40/04; B60W 2556/50; B60W 60/001; B60W 50/082; B60W 30/18163
See application file for complete search history.

(56) References Cited

U.S. PATENT DOCUMENTS 5,177,685 A * 1/1993 Davis .................. B60R 16/0373
340/988
9,304,513 B2 * 4/2016 Ichikawa ............. G05D 1/0214
(Continued)

FOREIGN PATENT DOCUMENTS

JP    WO2011158347 A1    8/2013
JP         5382218 B2    1/2014
(Continued)

OTHER PUBLICATIONS

Japanese Office Action for Japanese Patent Application No. 2019-061291 dated May 16, 2022 (partially translated).

*Primary Examiner* — Mary Cheung
(74) *Attorney, Agent, or Firm* — Thomas | Horstemeyer, LLP (57) ABSTRACT

A vehicle control apparatus for controlling a vehicle, comprising, a setting unit that accepts setting of a destination; an acquisition unit that acquires peripheral information of the vehicle; and a control unit that controls traveling of the vehicle based on the peripheral information, wherein the control unit executes, if the destination has been set, first control in which first assist for a course change is performed in accordance with a case in which the vehicle has entered a course change area from a first road existing on a traveling route to the destination to a second road connected to the first road, and executes, if the destination has not been set, second control in which second assist with an assist level lower than in the first assist is performed on a road existing on a current traveling route.

9 Claims, 5 Drawing Sheets

(56) References Cited

U.S. PATENT DOCUMENTS

| | | |
|---|---|---|
| 9,671,241 B2 * | 6/2017 | Tang .................. G01C 21/3469 |
| 9,891,622 B2 | 2/2018 | Ichikawa et al. |
| 10,435,025 B2 | 10/2019 | Ochida et al. |
| 2013/0110343 A1 | 5/2013 | Ichikawa et al. |
| 2014/0278052 A1 * | 9/2014 | Slavin .................. G08G 1/0129 |
| | | 701/400 |
| 2016/0170410 A1 | 6/2016 | Ichikawa et al. |
| 2018/0107216 A1 * | 4/2018 | Beaurepaire .......... B60W 50/08 |
| 2018/0143629 A1 | 5/2018 | Ichikawa et al. |
| 2018/0170389 A1 | 6/2018 | Ochida et al. |
| 2019/0086231 A1 * | 3/2019 | Arakawa ............... G05D 1/0088 |
| 2019/0135302 A1 * | 5/2019 | Kishi ............. B60W 30/18018 |
| 2019/0235499 A1 * | 8/2019 | Kazemi ................ B62D 15/025 |
| 2020/0290619 A1 * | 9/2020 | Mehdi ............. B60W 30/18163 |

FOREIGN PATENT DOCUMENTS

| | | | |
|---|---|---|---|
| JP | 2016146055 A * | 8/2016 | |
| JP | 2018-100009 A | 6/2018 | |
| JP | 2019117494 A * | 7/2019 | |
| WO | 2018/211583 A1 | 11/2018 | |

\* cited by examiner

VEHICLE CONTROL APPARATUS, VEHICLE CONTROL METHOD, VEHICLE, AND NON-TRANSITORY COMPUTER-READABLE STORAGE MEDIUM

CROSS-REFERENCE TO RELATED APPLICATION

This application claims priority to and the benefit of Japanese Patent Application No. 2019-061291 filed on Mar. 27, 2019, the entire disclosure of which is incorporated herein by reference.

BACKGROUND OF THE INVENTION

Field of the Invention

The present invention relates to a vehicle control apparatus, a vehicle control method, a vehicle, and a non-transitory computer-readable storage medium, and more specifically, a vehicle control technique of an automated driving vehicle.

Description of the Related Art

Japanese Patent No. 5382218 discloses that automated driving control for traveling along the current travel path is executed if no destination has been set, and automated driving control for traveling to a destination is executed if the destination has been set.

However, the conventional technique has a problem that excessive assist that is not desired by a user may be performed.

The present invention has been made in recognition of the above problem, and provides a technique for suppressing excessive assist that is not desired by a user, thereby implementing more comfortable automated driving.

SUMMARY OF THE INVENTION

According to one aspect of the present invention, there is provided a vehicle control apparatus that controls a vehicle, comprising, a setting unit configured to accept setting of a destination; an acquisition unit configured to acquire peripheral information of the vehicle; and a control unit configured to control traveling of the vehicle based on the peripheral information, wherein the control unit executes, if the destination has been set, first traveling control in which first traveling assist for a course change from a first road to a second road is performed in accordance with a case in which the vehicle has entered a course change area from the first road existing on a traveling route to the destination to the second road connected to the first road and existing on the traveling route, and executes, if the destination has not been set, second traveling control in which second traveling assist with an assist level lower than in the first traveling assist is performed on a road existing on a current traveling route.

BRIEF DESCRIPTION OF THE DRAWINGS

The due to drawings, which constitute a part of the specification, illustrate embodiments of the invention and, together with the description, serve to explain the invention.

DESCRIPTION OF THE EMBODIMENTS

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar arrangements, and redundant description thereof is omitted.

Vehicle Arrangement

Figure 1:
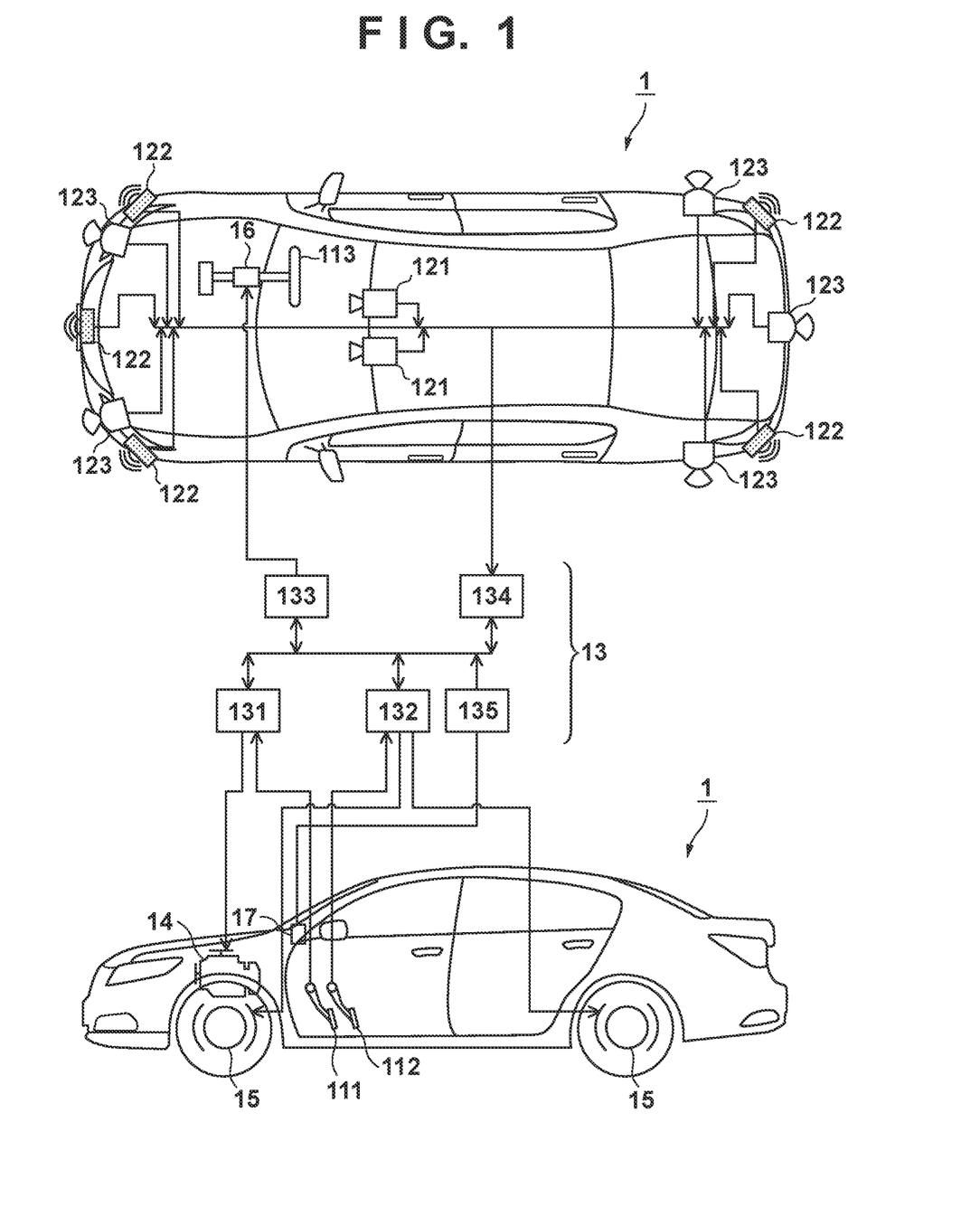
FIG. 1 is a view for explaining an arrangement example of a vehicle according to an embodiment.
Figure 2:
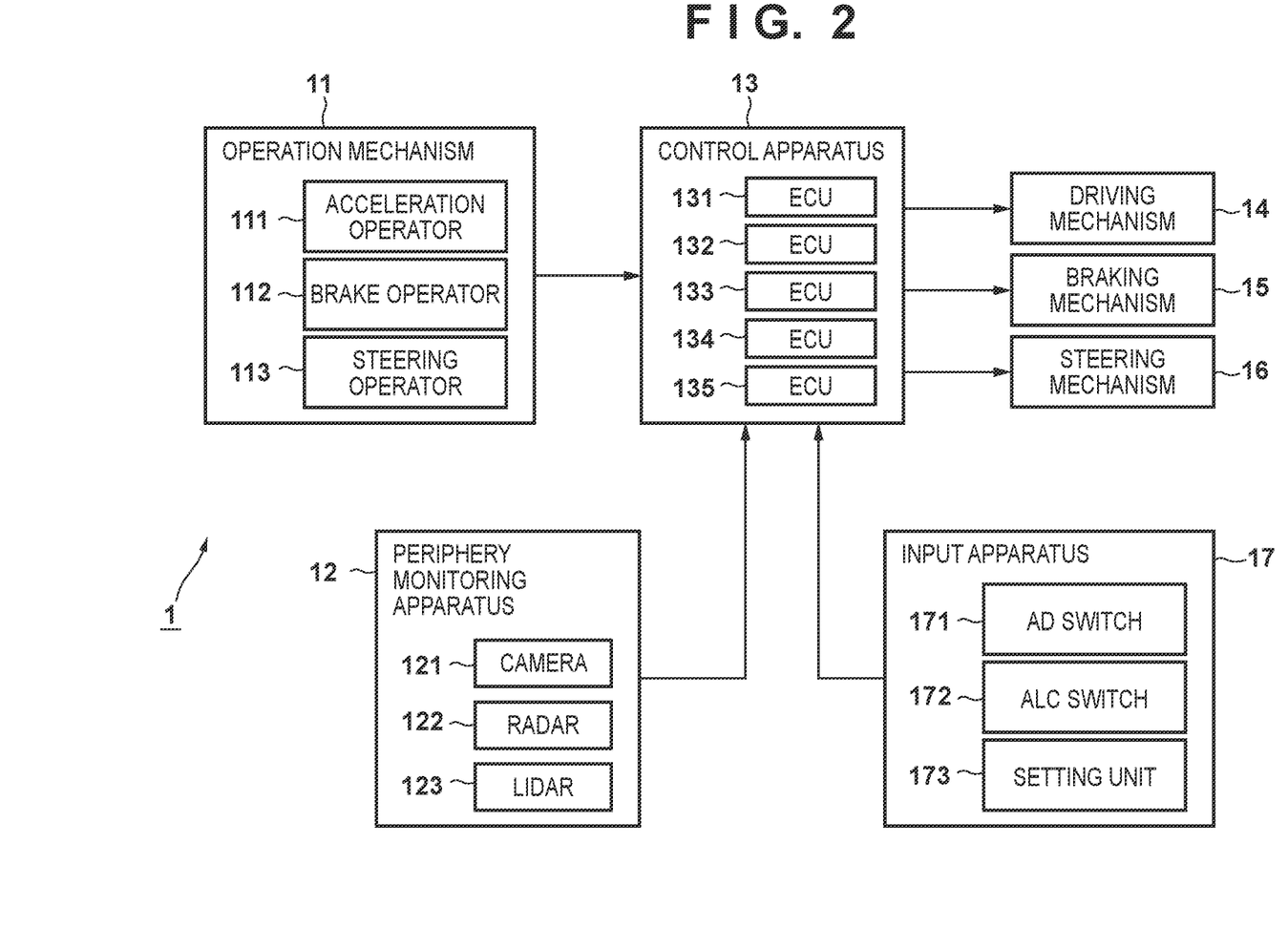
FIG. 2 is a block diagram for explaining the arrangement example of the vehicle according to the embodiment.

FIGS. 1 and 2 are views for explaining the arrangement of a vehicle 1 according to the first embodiment. FIG. 1 shows the installation positions of elements to be explained below and the connection relationships between the elements by using a top view and a side view of the vehicle 1. FIG. 2 is a system block diagram of the vehicle 1.

Note that in the following explanation, expressions such as front/rear, upper/lower, and lateral (left/right) will be used in some cases in order to indicate relative directions based on the vehicle body of the vehicle 1. For example, "front" indicates the front in the front-and-rear direction of the vehicle body, and "upper" indicates the direction of height of the vehicle body.

The vehicle 1 includes an operation mechanism 11, a periphery monitoring apparatus 12, a vehicle control apparatus 13, a driving mechanism 14, a braking mechanism 15, a steering mechanism 16, and an input apparatus 17. Note that the vehicle 1 is a four-wheeled car in this embodiment, but the number of wheels is not limited to this.

The operation mechanism 11 includes an acceleration operator 111, a brake operator 112, and a steering operator 113. Typically, the acceleration operator 111 is an accelerator pedal, the brake operator 112 is a brake pedal, and the steering operator 113 is a steering wheel. However, each of the operators 111 to 113 may also be another type of an operator such as a lever type operator or a button type operator.

The periphery monitoring apparatus 12 includes cameras 121, radars 122, and LiDARs (Light Detection and Ranging) 123, all of which function as sensors for monitoring or detecting the peripheral environment of the vehicle (self-vehicle) 1. The camera 121 is an imaging device using, for example, a CCD image sensor or a CMOS image sensor. The radar 122 is a distance measurement device such as a millimeter-wave radar. The LiDAR 123 is a distance measurement device such as a laser radar. As exemplarily shown in FIG. 1, these devices are arranged in positions where the peripheral environment of the vehicle 1 can be detected, for example, on the front side, rear side, upper side, and lateral sides of the vehicle body.

Examples of the peripheral environment of the vehicle 1 described above are the traveling environment of the vehicle 1 and the related peripheral environments (for example, the extending direction of a traffic lane, a travelable region, and the color of a traffic signal) of the vehicle 1, and peripheral object information (for example, the presence/absence of an object such as another vehicle, a pedestrian, or an obstacle, and the attribute, the position, the direction and speed of the movement of the object) of the vehicle 1. From this viewpoint, the periphery monitoring apparatus 12 can also be expressed as a detection device for detecting peripheral information of the vehicle 1.

The vehicle control apparatus 13 is capable of controlling the vehicle 1 and, for example, controls the mechanisms 14 to 16 based on signals from the operation mechanism 11, the periphery monitoring apparatus 12, and the input apparatus 17. The vehicle control apparatus 13 includes ECUs (Electronic Control Units) 131 to 135. Each ECU includes a CPU, a memory, and a communication interface. Each ECU causes the CPU to perform predetermined processing based on information (data or an electrical signal) received via the communication interface, stores the processing result in the memory, or outputs the processing result to another element via the communication interface.

The ECU 131 is an acceleration ECU and, for example, controls the driving mechanism 14 based on the amount of operation of the acceleration operator 111 performed by the driver. The ECU 132 is a braking ECU and, for example, controls the braking mechanism 15 based on the amount of operation of the brake operator 112 performed by the driver. The braking mechanism 15 is, for example, a disk brake formed in each wheel. The ECU 133 is a steering ECU and, for example, controls the steering mechanism 16 based on the amount of operation of the steering operator 113 performed by the driver. The steering mechanism 16 includes, for example, a power steering.

The ECU 134 is an analytical ECU installed for the periphery monitoring apparatus 12. The ECU 134 performs predetermined analysis/processing based on the peripheral environment of the vehicle 1 obtained by the periphery monitoring apparatus 12, and outputs the result to the ECUs 131 to 133. The ECU 135 is a processing ECU installed for the input apparatus 17. The ECU 135 performs predetermined analysis/processing based on the various types of information input by the input apparatus 17, and outputs the result to the ECUs 131 to 133.

That is, the ECUs 131 to 133 can control the mechanisms 14 to 16 based on signals from the ECU 134 and/or the ECU 135. With this arrangement, the vehicle control apparatus 13 can control traveling of the vehicle 1 in accordance with the peripheral environment, for example, can perform automated driving.

The input apparatus 17 includes an AD switch 171, an ALC switch 172, and a setting unit 173. The AD switch 171 is a switch for instructing the start of automated driving. The ALC switch 172 is a switch for enabling an automated lane change function. When the ALC switch 172 is in an ON state, the vehicle 1 can automatically change a lane based on self-determination. The setting unit 173 can accept various types of inputs from a user. For example, the setting of a destination of the vehicle 1 is accepted. The setting unit 173 corresponds to a destination input unit of a navigation device (not shown) or the like. The vehicle control apparatus 13 may include at least some components of the input apparatus 17.

In this specification, automated driving is a state in which the vehicle control apparatus 13 performs some or all of the driving operations (acceleration, braking , and steering), instead of the driver. That is, the concept of automated driving includes a form (so-called complete automated driving) in which the vehicle control apparatus 13 performs all of the driving operations, and a form (so-called drive assist) in which the vehicle control apparatus 13 performs only some of the driving operations. Examples of drive assist are a speed control (auto cruise control) function, a distance control (adaptive cruise control) function, a lane departure prevention assist (lane keep assist) function, and a collision avoidance assist function.

Note that the vehicle control apparatus 13 is not limited to this arrangement. For example, a semiconductor device such as an ASIC (Application Specific Integrated Circuit) may also be used as each of the ECUs 131 to 135. That is, the functions of the ECUs 131 to 135 can be implemented by either hardware or software. Also, some or all of the ECUs 131 to 135 can be configured by a single ECU.

Traveling Control

In this embodiment, the vehicle control apparatus 13 can execute a plurality of traveling control operations. The plurality of traveling control operations are classified into a plurality of stages depending on the degree of automation (automation rate) in vehicle control and the degree of tasks required of a vehicle passenger (driver) (the degree of involvement in vehicle operations of the vehicle passenger).

For each of the plurality of traveling control operations, vehicle control related to acceleration, deceleration, steering including a lane change, braking, and the like of the vehicle, and tasks required of a vehicle passenger (driver) are set. The tasks required of the vehicle passenger include operations required of the vehicle passenger to cope with a request of monitoring the periphery of the vehicle, such as gripping a steering wheel (hands-off or hands-on), monitoring the periphery (eyes-off or eyes-on), and changing the driving subject.

The vehicle control apparatus 13 can perform automated driving traveling of the vehicle 1 by any one of the plurality of traveling control operations based on information (external information) on the peripheral environment of the vehicle 1 acquired by the periphery monitoring apparatus 12.

First traveling control is control executed if a destination has been set, and is traveling control that enables execution of first traveling assist (branch assist or merging assist) in a course change area (for example, a predetermined area including a branch point or a merging point) from a first road to a second road existing on a traveling route to the destination. The first traveling assist (branch assist or merging assist) is, for example, traveling control in which lateral (vehicle width direction)/longitudinal (front-and-rear direction) control is executed to execute a course change from the first road to the second road. A course change from a merging road to a main road is referred to as merging assist and a course change from a main road to a branch road is referred to as branch assist, but control contents are similar in these assist operations. In addition, after the course change is completed, traveling assist that continues lane keeping, inter-vehicle distance keeping, and constant speed traveling may be performed.

Second traveling control is control executed if no destination has been set, and is traveling control that continues second traveling assist (lane keeping, inter-vehicle distance keeping, and constant speed traveling) so as to travel on a main road along the road. In the second traveling control, the first traveling assist (branch assist or merging assist) is not performed in a course change area existing on the current traveling route. The second traveling assist is traveling assist different from the first traveling assist and, for example, may be traveling assist with an assist level lower than in the first traveling assist. The second traveling control is traveling control in which the automation rate is relatively low or the degree of involvement in vehicle operations required of the driver is relatively increased compared with the first traveling control.

In both the first traveling control and the second traveling control, the driving subject of the vehicle 1 is the vehicle control apparatus 13 (vehicle system), and the driver is not required to monitor the periphery and grip the steering wheel. However, the driver may be required to monitor the vehicle system in case a warning notification is received from the vehicle control apparatus 13 (vehicle system). In both the first traveling control and the second traveling control, an automated lane change from a first lane to a second lane of a road including a plurality of traffic lanes along the traveling route is executable. This automated lane change includes a lane change to the second lane due to disappearance of the first lane ahead of the travel direction of the vehicle 1 along the traveling route. That is, the course change in a course change area (for example, a predetermined area including a branch point/merging point) is a course change from the first road to the second road heading to a different direction, and does not include a lane change.

As described above, depending on whether a destination has been set, whether to provide the traveling assist function related to a course change in a course change area is switched. With this arrangement, in a situation in which no destination has been set, it is possible to prevent provision of traveling assist related to an excessive course change that is not desired by a user.

Processing

Figure 3:
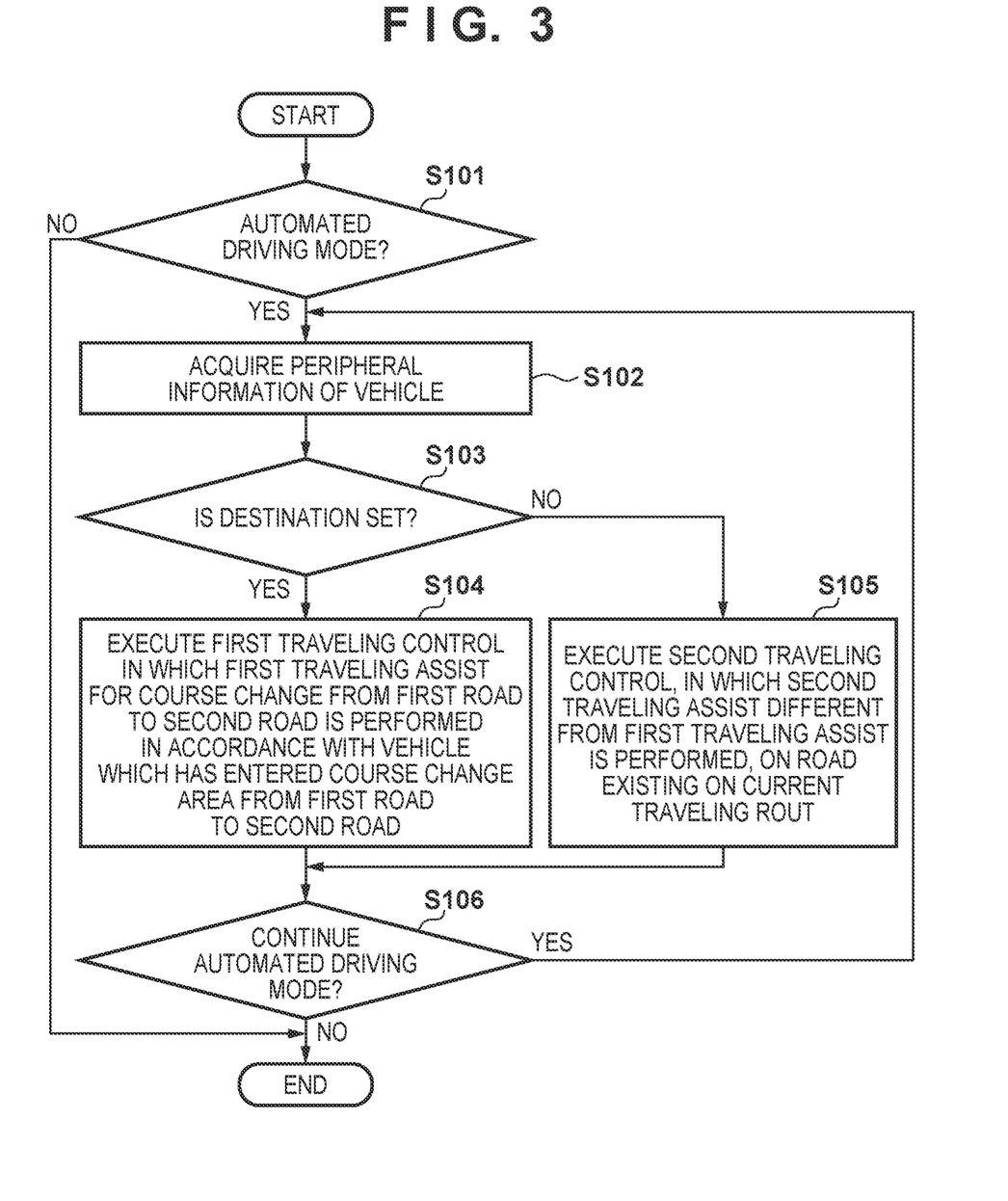
FIG. 3 is a flowchart for explaining an example of the procedure of processing executed by a vehicle control apparatus according to the embodiment.
Figure 4:
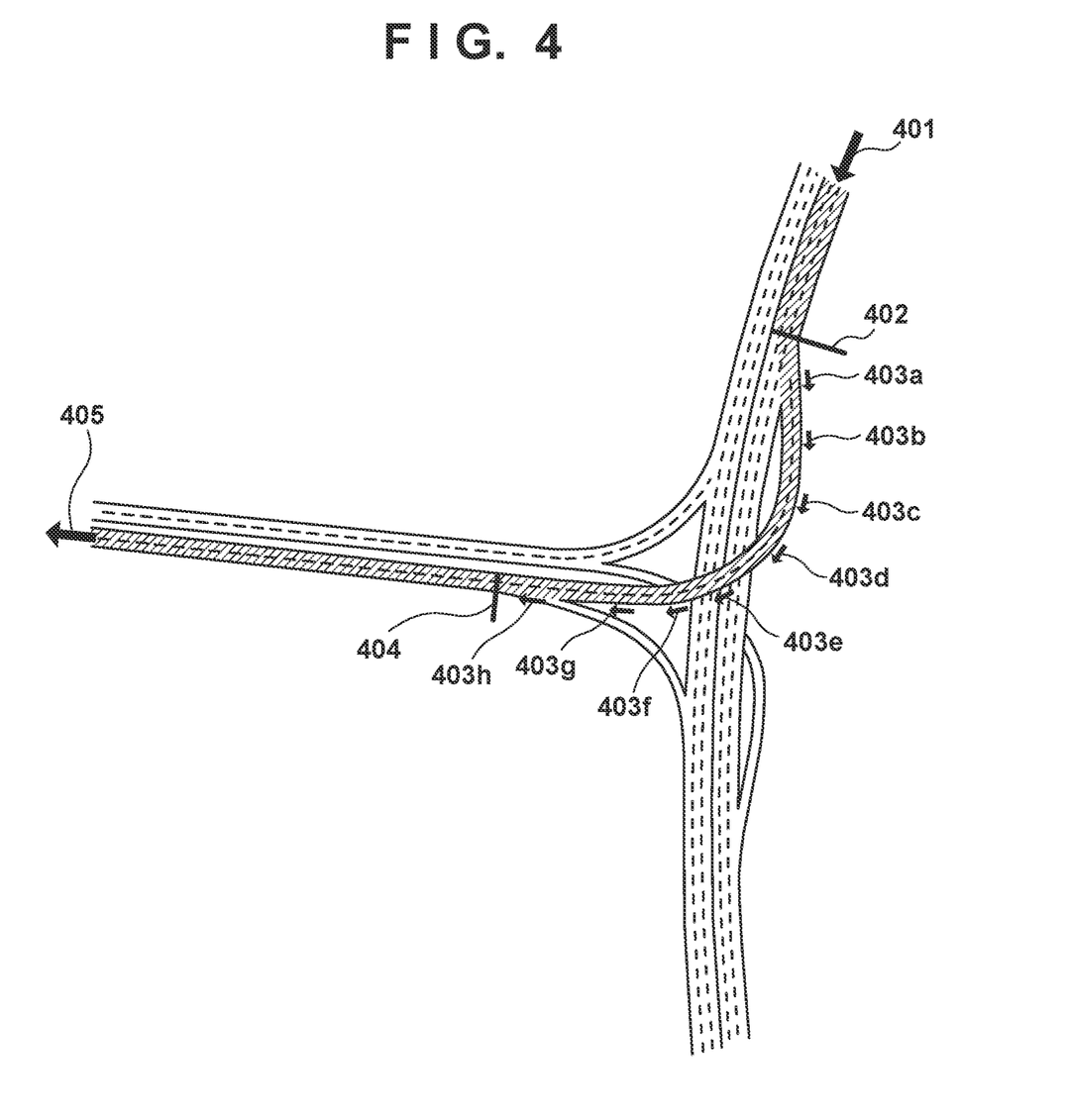
FIG. 4 is a view explaining a road according to the embodiment (in a case in which a destination has been set)
Figure 5:
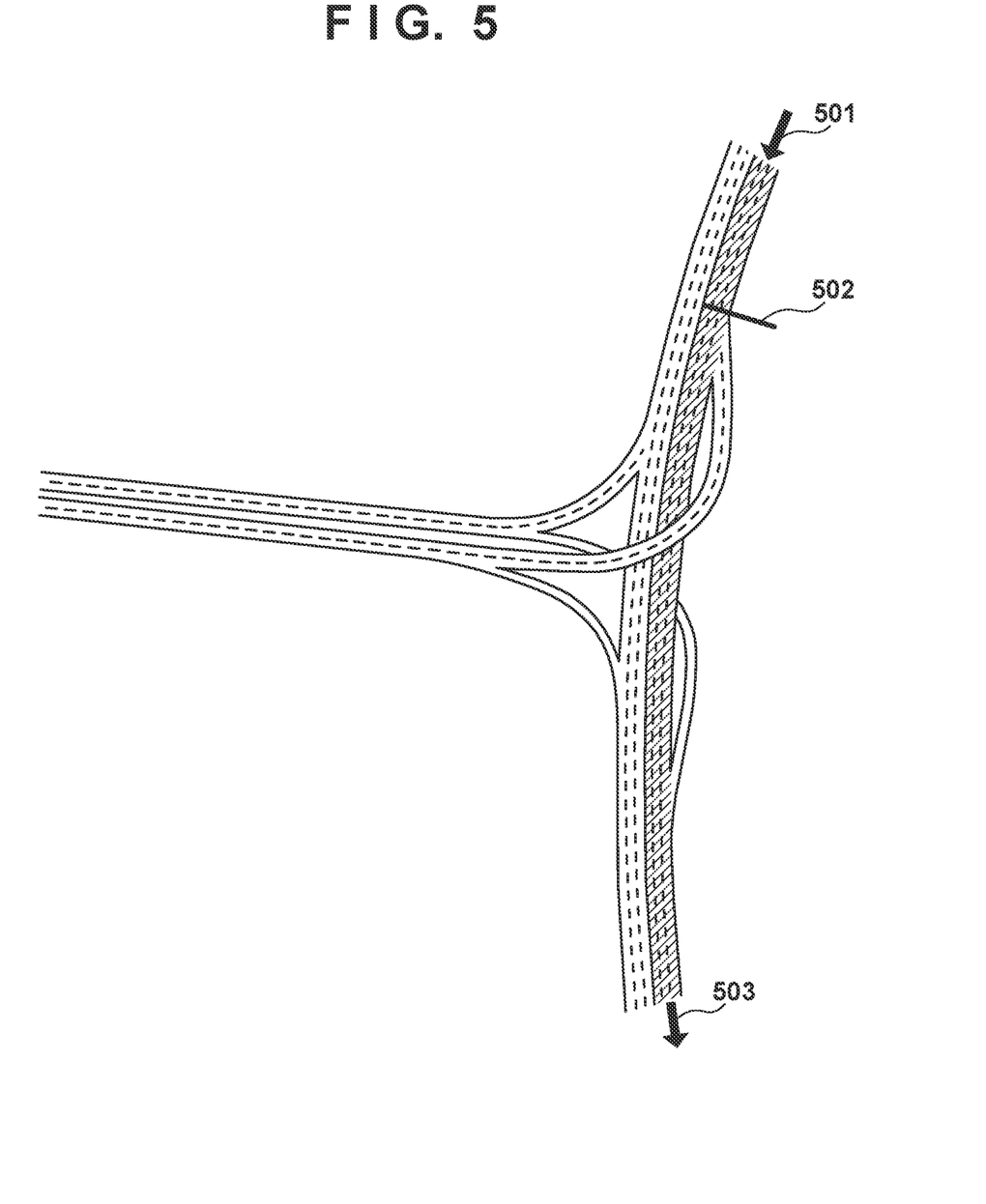
FIG. 5 is a view explaining a road according to the embodiment (in a case in which no destination has been set).

Next, the details of processing according to this embodiment will be described with reference to FIGS. 3 to 5. FIG. 3 is a flowchart for explaining an example of the procedure of the vehicle control according to this embodiment. FIG. 4 is a view explaining a road on which the vehicle 1 according to this embodiment travels if a destination has been set. FIG. 5 is a view explaining a road on which the vehicle 1 according to this embodiment travels if no destination has been set.

In step S101 (this is simply referred to as "S101" hereinafter, and the same applies to other steps) of FIG. 3, the vehicle control apparatus 13 determines whether the operation mode of the vehicle 1 is the automated driving mode. If it is the automated driving mode, the process advances to S102. Otherwise (if it is the normal mode in which all of the driving operations are performed by the driver), this procedure is terminated. Note that switching between the normal mode and the automated driving mode as the operation mode of the vehicle 1 can be performed when the driver (or a person who can be a driver when automated driving is canceled) presses a predetermined switch in the vehicle.

In S102, the vehicle control apparatus 13 acquires the peripheral information of the vehicle 1. This step is performed by the ECU 134 of the vehicle control apparatus 13 receiving the peripheral information of the vehicle 1 detected by the periphery monitoring apparatus 12. The vehicle control apparatus 13 controls the operation of the vehicle 1 based on the peripheral information.

In S103, the vehicle control apparatus 13 determines whether a destination of the vehicle 1 has been set. This step is performed by determining whether a destination of the vehicle 1 has been set by the user via the setting unit 173.

If the destination has been set, the process advances to S104. On the other hand, if no destination has been set, the process advances to S105.

In S104, the vehicle control apparatus 13 executes the first traveling control in which the first traveling assist for a course change from the first road to the second road is performed in accordance with a case in which the vehicle has entered a course change area from the first road existing on a traveling route to the destination to the second road connected to the first road and existing on the traveling route.

Here, a description will be made with reference to FIG. 4. In FIG. 4, the vehicle 1 travels on a guide route to the set destination. More specifically, the vehicle 1 travels on a main road to a direction indicated by an arrow 401, and changes its course to a branch road at a branch point 402. This branch point is the course change area from the main road (first road) to the branch road (second road). Then, the vehicle 1 travels on the branch road along arrows 403a to 403h. The branch road becomes a main road after a merging point 404. The vehicle 1 keeps traveling on the main road in a direction indicated by an arrow 405.

In this manner, if a destination has been set, it is assumed that the user desires traveling assist related to a course change in a course change area (branch point 402), so that traveling assist related to a course change is performed.

In S105, the vehicle control apparatus 13 executes the second traveling control, in which the second traveling assist different from the first traveling assist is performed, on a road existing on the current traveling route. For example, the second traveling assist is traveling assist (for example, lane keeping, inter-vehicle distance keeping, or constant speed driving) with an assist level lower than in the first traveling assist (such as branch assist or merging assist). In the second traveling assist, branch assist or merging assist like the first traveling assist is not performed.

Here, a description will be made with reference to FIG. 5. If no destination has been set, traveling along a route (a route along the road) without course changes is performed. In this case, the vehicle 1 travels from an arrow 501 along the road without changing its course at a branch point 502 (course changing area), and travels to an arrow 503. If the first traveling assist (branch assist or merging assist) is performed at the branch point 502 if no destination has been set, this may provide excessive assist for the user. Therefore, if no destination has been set, control is executed in which the first traveling assist is not performed in a course change area to suppress excessive assist. It may be configured so as not to accept an instruction to execute an automated lane change even if such an instruction is input by the user.

In S106, the vehicle control apparatus 13 determines whether the operation mode of the vehicle 1 continues the automated driving mode. If the automated driving mode is continued, the process returns to S102. Otherwise, this procedure is terminated. Thus, a series of processing of FIG. 3 is completed.

As has been described above, in this embodiment, if a destination has been set, the first traveling control is executed in which the first traveling assist is performed in a course change area from the first road to the second road existing on the traveling route to the destination, and if no destination has been set, the second traveling control is executed in which the second traveling assist different from the first traveling assist is performed on a road existing on the current traveling route. This enables suppression of excessive assist that is not desired by the user.

Note that in this embodiment, the branch point at which the road branches has been exemplified as a course change area of a road. However, this embodiment is also applicable to a case in which not only a branch point but also a merging point at which a plurality of roads merge is used as the course change area.

In addition, in this embodiment, an example has been described in which whether to provide the first traveling assist (branch assist or merging assist) in the course change area is selected based on whether a destination has been set. However, the automated lane change from the first lane to the second lane of a road including a plurality of lanes along the traveling route may be executable in either of the first traveling control and the second traveling control. This automated lane change includes a lane change to the second lane due to disappearance of the first lane ahead of the travel direction of the vehicle along the traveling route. That is, the automated lane change function is enabled in either the first traveling control or the second traveling control, so that an automated lane change due to lane reduction is enabled. In this manner, the automated lane change function is constantly enabled in a course change area. This enables execution of control with a higher automation rate in a course change area. In addition, no course change against user's intention occurs.

Note that as the procedure of automated driving, a user may first operate the AD switch 171 to start automated driving and then operate the setting unit 173 to input a destination. In addition, the user can enable, at an arbitrary timing, the automated lane change function by operating the ALC switch 172 which becomes operable after the AD switch 171 is operated.

It may be configured such that whether a destination has been set is determined when the AD switch 171 (first instruction unit) is operated and the ALC switch 172 (second instruction unit) is also operated to enable the automated lane change function. That is, whether a destination has been set may be determined in accordance with the operation of the ALC switch 172, and one of the first traveling control and the second traveling control may be selected based on the determination result.

In this manner, by determining whether a destination has been set at a timing when the ALC switch 172 is turned on, determination considering the latest situation can be performed even when a destination is set after the automated driving is started.

Further, it may be configured such that a guide notification of the first traveling assist is provided before the vehicle passes through a course change area, and the first traveling assist in the course change area is performed in accordance with a reserved operation by the user in response to the guide notification. The guide notification is, for example, a notification by audio, display, or the like indicating that there is a course change area 5 km ahead. An operation to reserve the execution of the first traveling assist in the course change area can be accepted by operating the setting unit 173, and the first traveling assist is configured to be performed only in response to the reserved operation. This reserved operation may be a half-hold operation of a turn signal lever (not shown) provided near a steering wheel (not shown) by a vehicle passenger.

Thus, it becomes possible that, even if a destination has been set, if the user considers traveling assist related to a course change to be unnecessary, no traveling assist related to the course change is performed.

According to the present invention, excessive assist that is not desired by a user can be suppressed, and more comfortable automated driving can be implemented.

Other Embodiments

A vehicle control program that implements one or more functions described in each embodiment is supplied to a system or an apparatus via a network or a storage medium, and one or more processors in the computer of the system or the apparatus can read out and execute this program. The present invention can also be implemented by such embodiments.

Summary of Embodiments

Arrangement 1. The vehicle control apparatus according to the above-described embodiment is a vehicle control apparatus (for example, 13) that controls a vehicle (for example, 1), comprising
setting means (for example, 173, 135) for accepting setting of a destination,
acquisition means (for example, 134) for acquiring peripheral information of the vehicle, and
control means (for example, 131-133) for controlling traveling of the vehicle based on the peripheral information,
wherein the control means executes, if the destination has been set, first traveling control in which first traveling assist for a course change from a first road to a second road is performed in accordance with a case in which the vehicle has entered a course change area from the first road existing on a traveling route to the destination to the second road connected to the first road and existing on the traveling route, and
executes, if the destination has not been set, second traveling control in which second traveling assist with an assist level lower than in the first traveling assist is performed on a road existing on a current traveling route.

With this arrangement, excessive assist that is not desired by a user can be suppressed, and more comfortable automated driving can be implemented.

Arrangement 2. In the vehicle control apparatus according to the above-described embodiment, the course change area is a predetermined area including one of a branch point and a merging point of a motorway.

With this arrangement, in the vicinity of the branch point or the merging point, excessive assist that is not desired by a user can be suppressed, and more comfortable automated driving can be implemented.

Arrangement 3. In the vehicle control apparatus according to the above-described embodiment, in the first traveling control and the second traveling control, the control means can execute, after determining that travel directions are identical in a plurality of lanes along the traveling route, an automated lane change from a first lane to a second lane of a road including the plurality of lanes.

With this arrangement, control with a higher automation rate can be executed in a course change area.

Arrangement 4. In the vehicle control apparatus according to the above-described embodiment, the automated lane change includes a lane change to the second lane due to disappearance of the first lane ahead of the vehicle in the travel direction along the traveling route.

With this arrangement, an automated lane change can be performed at a time of lane reduction.

Arrangement 5. There is provided the vehicle control apparatus according to the above-described embodiment, further comprising first instruction means (for example, 171, 135) for instructing a start of an automated driving function of the vehicle, and second instruction means (for example, 172, 135), operable after an instruction by the first instruction means, for instructing a start of an automated lane change function, wherein the control means selects one of the first traveling control and the second traveling control in accordance with an operation of the second instruction means.

With this arrangement, determination considering the latest situation can be performed even when a destination is set after the automated driving is started.

Arrangement 6. In the vehicle control apparatus according to the above-described embodiment, the control means provides a guide notification of the first traveling assist before the vehicle passes through the course change area, and performs the first traveling assist in the course change area in accordance with a reserved operation by a user in response to the guide notification.

With this arrangement, it becomes possible that, even if a destination has been set, when the user considers traveling assist to be unnecessary, no assist is performed.

Arrangement 7. In the vehicle control apparatus according to the above-described embodiment, the reserved operation is an operation of a turn signal lever by the user on the first road.

With this arrangement, it becomes possible to perform reservation with a simple operation.

Arrangement 8. The vehicle according to the above-described embodiment is a vehicle (for example, 1) comprising a vehicle control apparatus defined in any one of arrangements 1 to 7.

With this arrangement, it becomes possible to implement adaptive automated driving with further improved safety in the vehicle.

Arrangement 9. The vehicle control method according to the above-described embodiment is a vehicle control method of controlling a vehicle (for example, 1), the method comprising a setting step of accepting setting of a destination, an acquisition step of acquiring peripheral information of the vehicle, and a control step of controlling traveling of the vehicle based on the peripheral information, wherein in the control step, if the destination has been set, first traveling control is executed in which first traveling assist for a course change from a first road to a second road is performed in accordance with a case in which the vehicle has entered a course change area from the first road existing on a traveling route to the destination to the second road connected to the first road and existing on the traveling route, and if the destination has not been set, second traveling control is executed in which second traveling assist with an assist level lower than in the first traveling assist is performed on a road existing on a current traveling route.

With this arrangement, excessive assist that is not desired by a user can be suppressed, and more comfortable automated driving can be implemented.

Arrangement 10. A program according to the above-described embodiment is a program for causing a computer to function as a vehicle control apparatus (for example, 13) defined in any one of arrangements 1 to 7.

With this arrangement, the processing of the vehicle control apparatus can be implemented by a computer.

The invention is not limited to the foregoing embodiments, and various variations/changes are possible within the spirit of the invention.

What is claimed is:

1. A vehicle control apparatus that controls a vehicle, comprising:
   a setting unit configured to accept setting of a destination;
   an acquisition unit configured to acquire peripheral information of the vehicle; and
   a control unit configured to control traveling of the vehicle based on the peripheral information,
   wherein the control unit executes, if the destination has been set, first traveling control in which first traveling assist for a course change from a first road to a second road is performed in accordance with a case in which the vehicle has entered a course change area from the first road existing on a traveling route to the destination to the second road connected to the first road and existing on the traveling route, and
   executes, if the destination has not been set, second traveling control in which second traveling assist with an assist level lower than in the first traveling assist is performed on a road existing on a current traveling route,
   wherein the control unit provides a guide notification of the first traveling assist before the vehicle passes through the course change area, and performs the first traveling assist in the course change area in accordance with a reserved operation to make the course change by a user in response to the guide notification.

2. The apparatus according to claim 1, wherein the course change area is a predetermined area including one of a branch point and a merging point of a motorway.

3. The apparatus according to claim 1, wherein in the first traveling control and the second traveling control, the control unit can execute, after determining that travel directions are identical in a plurality of lanes along the traveling route, an automated lane change from a first lane to a second lane of a road including the plurality of lanes.

4. The apparatus according to claim 3, wherein the automated lane change includes a lane change to the second lane due to disappearance of the first lane ahead of the vehicle in the travel direction along the traveling route.

5. The apparatus according to claim 1, further comprising:
   a first instruction unit configured to instruct a start of an automated driving function of the vehicle; and
   a second instruction unit operable after an instruction by the first instruction unit and configured to instruct a start of an automated lane change function,
   wherein the control unit selects one of the first traveling control and the second traveling control in accordance with an operation of the second instruction unit.

6. The apparatus according to claim 1, wherein the reserved operation is an operation of a turn signal lever by the user on the first road.

7. A vehicle comprising a vehicle control apparatus that controls the vehicle, the vehicle control apparatus comprising:
   a setting unit configured to accept setting of a destination;
   an acquisition unit configured to acquire peripheral information of the vehicle; and
   a control unit configured to control traveling of the vehicle based on the peripheral information,
   wherein the control unit executes, if the destination has been set, first traveling control in which first traveling assist for a course change from a first road to a second road is performed in accordance with a case in which the vehicle has entered a course change area from the first road existing on a traveling route to the destination to the second road connected to the first road and existing on the traveling route, and executes, if the destination has not been set, second traveling control in which second traveling assist with an assist level lower than in the first traveling assist is performed on a road existing on a current traveling route, wherein the control unit provides a guide notification of the first traveling assist before the vehicle passes through the course change area, and performs the first traveling assist in the course change area in accordance with a reserved operation to make the course change by a user in response to the guide notification.

8. A vehicle control method of controlling a vehicle, the method comprising:

accepting setting of a destination;

acquiring peripheral information of the vehicle; and controlling traveling of the vehicle based on the peripheral information, wherein in the controlling, if the destination has been set, first traveling control is executed in which first traveling assist for a course change from a first road to a second road is performed in accordance with a case in which the vehicle has entered a course change area from the first road existing on a traveling route to the destination to the second road connected to the first road and existing on the traveling route, and if the destination has not been set, second traveling control is executed in which second traveling assist with an assist level lower than in the first traveling assist is performed on a road existing on a current traveling route, wherein in the controlling, a guide notification of the first traveling assist is provided before the vehicle passes through the course change area, and the first traveling assist in the course change area is performed in accordance with a reserved operation to make the course change by a user in response to the guide notification.

9. A non-transitory computer-readable storage medium storing a program for causing a computer to perform a vehicle control method of controlling a vehicle, the method comprising:

accepting setting of a destination;

acquiring peripheral information of the vehicle; and controlling traveling of the vehicle based on the peripheral information, wherein in the controlling, if the destination has been set, first traveling control is executed in which first traveling assist for a course change from a first road to a second road is performed in accordance with a case in which the vehicle has entered a course change area from the first road existing on a traveling route to the destination to the second road connected to the first road and existing on the traveling route, and if the destination has not been set, second traveling control is executed in which second traveling assist with an assist level lower than in the first traveling assist is performed on a road existing on a current traveling route, wherein in the controlling, a guide notification of the first traveling assist is provided before the vehicle passes through the course change area, and the first traveling assist in the course change area is performed in accordance with a reserved operation to make the course change by a user in response to the guide notification.

* * * * *